US010052966B2

United States Patent
Kim

(10) Patent No.: US 10,052,966 B2
(45) Date of Patent: Aug. 21, 2018

(54) APPLICATION MODULE MODE CONTROL APPARATUS AND MODE CONTROL METHOD THEREOF

(71) Applicant: LG CHEM, LTD., Seoul (KR)

(72) Inventor: Jihoon Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 115 days.

(21) Appl. No.: 14/890,218

(22) PCT Filed: Oct. 31, 2014

(86) PCT No.: PCT/KR2014/010351
§ 371 (c)(1),
(2) Date: Nov. 10, 2015

(87) PCT Pub. No.: WO2015/065094
PCT Pub. Date: May 7, 2015

(65) Prior Publication Data
US 2016/0107536 A1  Apr. 21, 2016

(30) Foreign Application Priority Data

Oct. 31, 2013 (KR) .................. 10-2013-0130747

(51) Int. Cl.
*B60L 11/18* (2006.01)
*G06F 13/00* (2006.01)
(Continued)

(52) U.S. Cl.
CPC .......... *B60L 11/1861* (2013.01); *G05B 15/02* (2013.01); *G06F 13/00* (2013.01);
(Continued)

(58) Field of Classification Search
CPC ... B60L 11/1861; G05B 15/02; G06F 13/385; G06F 13/00; G06F 13/14; G06F 13/10
(Continued)

(56) References Cited

U.S. PATENT DOCUMENTS

2008/0211459 A1* 9/2008 Choi .................. B60L 3/0046
320/134
2010/0055543 A1 3/2010 Tae et al.
(Continued)

FOREIGN PATENT DOCUMENTS

WO WO 2012/018204 A2 2/2012
WO WO 2012/091287 A1 7/2012

OTHER PUBLICATIONS

Naumann, AUTOSAR Runtime Environment and Virtual Function Bus, 2009, Department for System Analysis and Modeling, Hasso-Plattner Institute for IT-Systems Engineering (Year: 2009).*
(Continued)

*Primary Examiner* — Nadeem Odeh
(74) *Attorney, Agent, or Firm* — Birch, Stewart, Kolasch & Birch, LLP

(57) ABSTRACT

The present invention relates to an application module mode control apparatus and a mode control method thereof, and more particularly, to an application module mode control apparatus and a mode control method thereof which can arbitrarily change a mode for each application module regardless of a change of a mode condition of a project by taking charge of changing the mode of the application module so as to independently change modes of one or more application modules that perform functions of a battery management system (BMS).

6 Claims, 6 Drawing Sheets

(51) Int. Cl.
    *G06F 13/10*    (2006.01)
    *G06F 13/14*    (2006.01)
    *G06F 13/38*    (2006.01)
    *G05B 15/02*    (2006.01)

(52) U.S. Cl.
    CPC .............. *G06F 13/10* (2013.01); *G06F 13/14* (2013.01); *G06F 13/385* (2013.01)

(58) Field of Classification Search
    USPC .......................................................... 701/36
    See application file for complete search history.

(56) References Cited

U.S. PATENT DOCUMENTS

| | | |
|---|---|---|
| 2011/0316520 A1 | 12/2011 | Kawahara et al. |
| 2012/0274281 A1 | 11/2012 | Kim |
| 2013/0116868 A1* | 5/2013 | Erko .................... B60W 10/26 701/22 |
| 2013/0127418 A1 | 5/2013 | Oh et al. |

OTHER PUBLICATIONS

Voget, AUTOSAR and the Automotive Tool Chain, 2010, Design, Automation & Test in Europe Conference & Exhibition (Date), 2010 (Year: 2010).*
Kum et al., AUTOSAR Migration from Existing Automotive Software, Oct. 2008, International Conference on Control, Automation and Systems 2008 (Year: 2008).*
International Search Report, issued in PCT/KR2014/010351, dated Jan. 27, 2015.
Park et al. "Trend on SW Platform Standard(AUTOSAR) of Vehicle Electric Components", Jun. 2008, TTA Journal No. 117, pp. 89-100.
Written Opinion of the International Searching Authority, issued in PCT/KR2014/010351, dated Jan. 27, 2015.

* cited by examiner

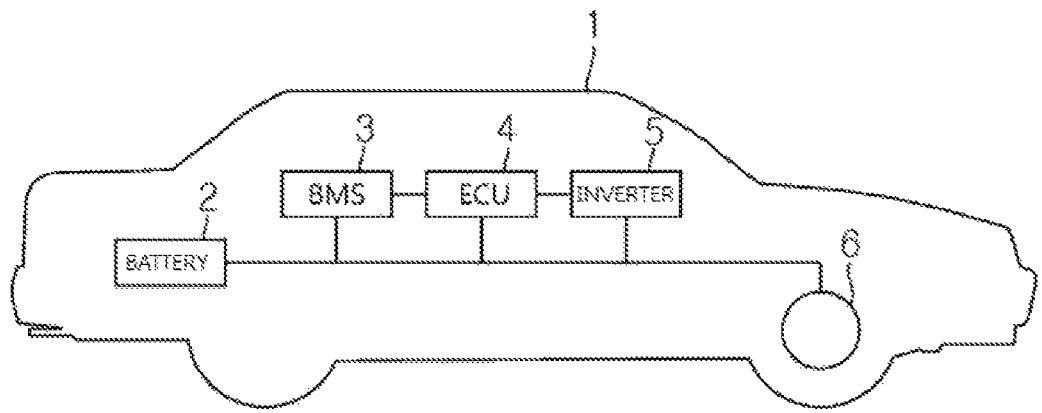
Fig. 1
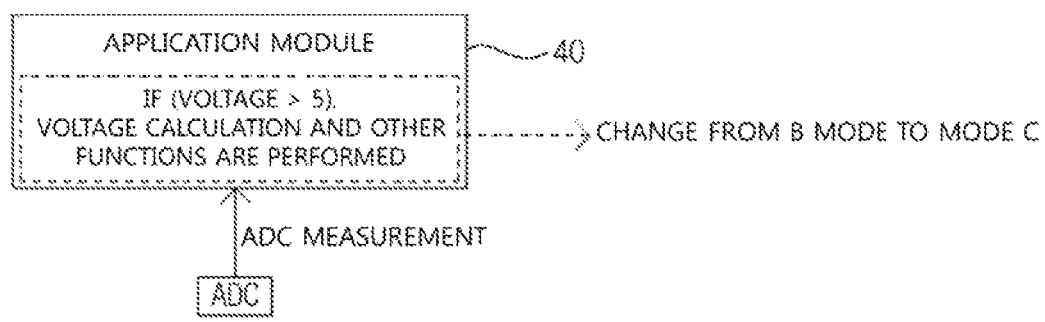
Fig. 2 --RELATED ART--

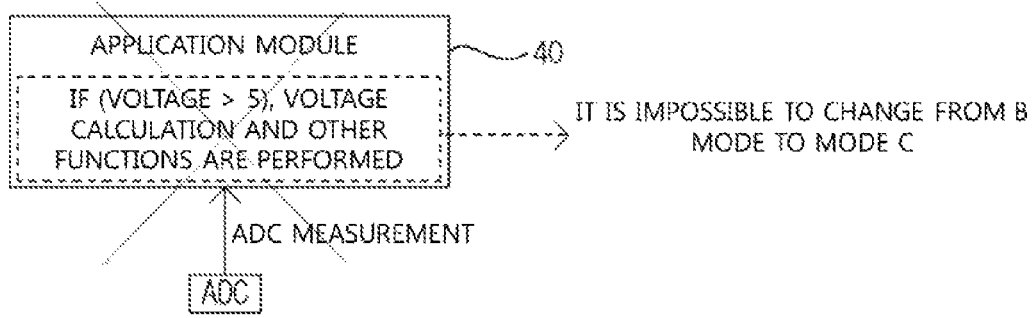
Fig. 3 --RELATED ART--
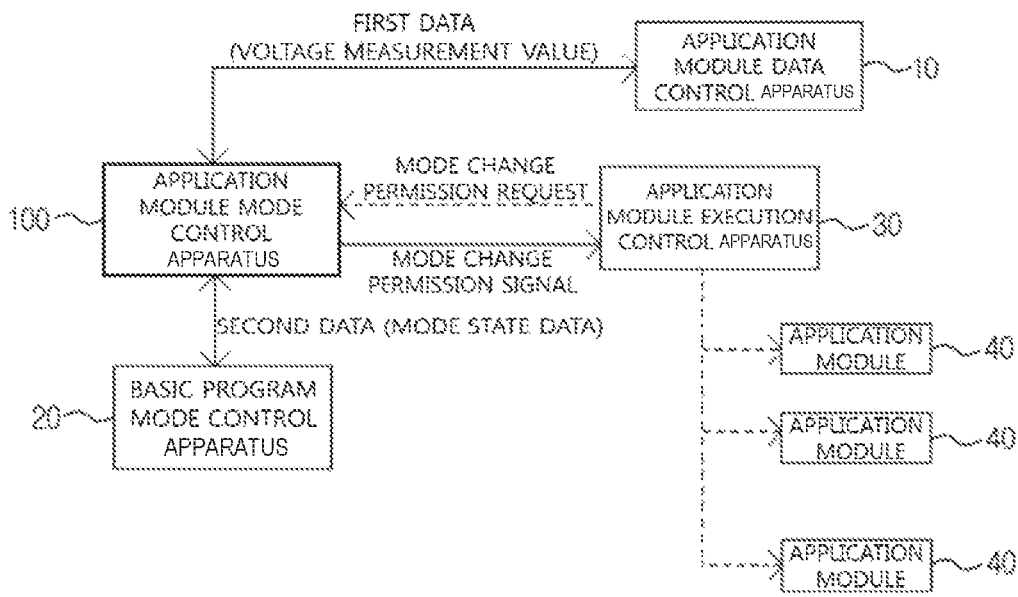
Fig. 4

APPLICATION MODULE MODE CONTROL APPARATUS AND MODE CONTROL METHOD THEREOF

TECHNICAL FIELD

This application claims priority to and the benefit of Korean Patent Application No. 10-2013-0130747 filed in the Korean Intellectual Property Office on Oct. 31, 2013, the entire contents of which are incorporated herein by reference.

The present invention relates to an application module mode control apparatus and a mode control method thereof, and more particularly, to an application module mode control apparatus and a mode control method thereof which can arbitrarily change a mode for each application module regardless of a change of a mode condition of a project by taking charge of changing the mode of the application module so as to independently change modes of one or more application modules that perform functions of a battery management system (BMS).

BACKGROUND ART

In general, batteries used for an electric vehicle (EV), a hybrid vehicle (HV), and a home or industry, that is, secondary batteries are high in application easiness depending on a product group and have electrical characteristics such as high energy density, and the like.

The secondary batteries have attracted public attention as a new energy source for environment-friendly and improvement of energy efficiency in that no by-product is generated depending on use of energy in addition to a primary advantage of remarkably reducing use of fossil fuel.

In this case, when multiple secondary batteries alternately perform charging and discharging, the multiple secondary batteries need to be managed so that the batteries maintain an appropriate operating state and performance by efficiently controlling the charging and discharging of the secondary batteries.

To this end, a battery management system (BMS) that manages a state and a performance of the battery is provided. The BMS measures current, voltage, a temperature, and the like of the battery to estimate a state of charging (SOC) of the battery based on the measured current, voltage, temperature, and the like and controls the SOC so that fuel consumption efficiency is highest. The SOC of the battery that performs the charging and discharging needs to be accurately measured in order to accurately control the SOC.

Meanwhile, since the battery management system in the related art cannot be standardized, a separate apparatus that manages a mode change of the application modules is not present in the mode change between application modules used in the battery management system in the related art and the mode change is directly achieved in the respective application modules.

Consequently, when a specific project (for example, a project in which the mode is changed from B to C when a measured voltage is 5 V or higher) to the other project (for example, a project in which the mode is changed from B to C when the measured voltage is 6 V or higher), the corresponding application module cannot be reused.

Further, in an AUTomotive System Architecture (AUTOSAR) meaning an automotive standard software architecture, an AUTOSAR Compliant standard software module cannot be simultaneously applied to application layers of an opened AUTOSAR and a non-opened AUTOSAR (NON-AUTOSAR), and as a result, the AUTOSAR Compliant standard software module should be individually developed according to the opened AUTOSAR and the non-opened AUTOSAR.

Therefore, the present inventor has invented an application module mode control apparatus and a mode control method thereof which can arbitrarily change a mode for each application module without adhering to a change of a mode condition of a project by taking charge of changing the mode of the application module so as to independently change modes of one or more application modules that perform functions of a battery management system (BMS).

DETAILED DESCRIPTION OF THE INVENTION

Technical Problem

The present invention is contrived to solve the aforementioned problems and an object of the present invention is to provide an application module mode control apparatus and a mode control method thereof which can arbitrarily change a mode for each application module without adhering to a change of a mode condition of a project by taking charge of changing the mode of the application module so as to independently change modes of one or more application modules that perform functions of a battery management system (BMS).

In more detail, another object of the present invention is to provide an application module mode control apparatus and a mode control method thereof which receive a voltage measurement value of each application module from an application module data control apparatus and compare the received voltage measurement value and a predetermined voltage value to verify whether the voltage measurement value coincides with a mode condition.

Further, yet another object of the present invention is to provide an application module mode control apparatus and a mode control method thereof which can receive mode state data for respective application modules from a basic program mode control apparatus, select mode state data which coincides with a mode condition among the received mode state data, and determine a mode of the application module based on the selected mode state data.

In addition, still another object of the present invention is to provide an application module mode control apparatus and a mode control method thereof which can be simultaneously applied to application layers of an opened AUTOSAR and a non-opened AUTOSAR.

Technical Solution

An exemplary embodiment of the present invention provides an application module mode control apparatus including: a first data receiving unit receiving first data from an application module data control apparatus (data manager); a second data receiving unit receiving second data from a basic program mode control apparatus (BSW mode manager); a mode determining unit determining modes of one or more application modules based on the first and second data; and a mode change permission signal transmitting unit receiving a mode change permission request from an application module execution control apparatus (activity manager) and transmitting to the application module execution control apparatus a mode change permission signal for changing the modes of one or more respective application modules to correspond to the determined mode.

The first data receiving unit may receive voltage measurement values for one or more respective application modules from the application module data control apparatus.

The second data receiving unit may receive mode state data for one or more respective application modules from the basic program mode control apparatus.

The mode determining unit may compare the received voltage measured value and a predetermined voltage value.

The mode determining unit may select mode state data corresponding to the compared result value among the received mode state data and determines the respective modes of one or more application modules based on the selected mode state data.

Another exemplary embodiment of the present invention provides an application module mode control method including: (a) receiving, by a first data receiving unit, first data from an application module data control apparatus (data manager); (b) receiving, by a second data receiving unit, second data from a basic program mode control apparatus (BSW mode manager); (c) determining, by a mode determining unit, respective modes of one or more application modules based on the first and second data; and (d) receiving, by a mode change permission signal transmitting unit, a mode change permission request from an application module execution control apparatus (activity manager) and transmitting to the application module execution control apparatus a mode change permission signal for changing the modes of one or more respective application modules to correspond to the determined mode.

Step (a) may include (a1) receiving, by the first data receiving unit, voltage measurement values for one or more respective application modules from the application module data control apparatus.

Step (b) may include (b1) receiving, by the second data receiving unit, mode state data for one or more respective application modules from the basic program mode control apparatus.

Step (c) may include (c1) comparing the voltage measured value received in step (a1) and a predetermined voltage value.

Step (c) may further include (c2) selecting mode state data corresponding to the result value compared in step (c1) among the mode state data received in step (b1); and (c3) determining the respective modes of one or more application modules based on the mode state data selected in step (c2).

Advantageous Effects

Since the present invention is not directly connected with one or more application modules and further, can control a mode change of the application module without being included in one or more application modules, even though a mode condition of a specific application module is changed, the mode change of the corresponding specific application module can be independently performed without replacing the corresponding specific application module.

Further, even though the mode condition of the specific application module is changed, the corresponding specific application module can be reused as it is without replacing the corresponding specific application module.

BRIEF DESCRIPTION OF DRAWINGS

FIG. 1 is a block diagram illustrating a configuration of an electric vehicle 1.

FIG. 2 is a diagram illustrating a mode change process of one or more application modules 40 on Project A in the related art.

FIG. 3 is a diagram illustrating a mode change process of one or more application modules 40 on Project B in the related art.

FIG. 4 is a diagram illustrating a connection state of an application module mode control apparatus 100 according to an exemplary embodiment of the present invention.

BEST MODE

Figure 5:
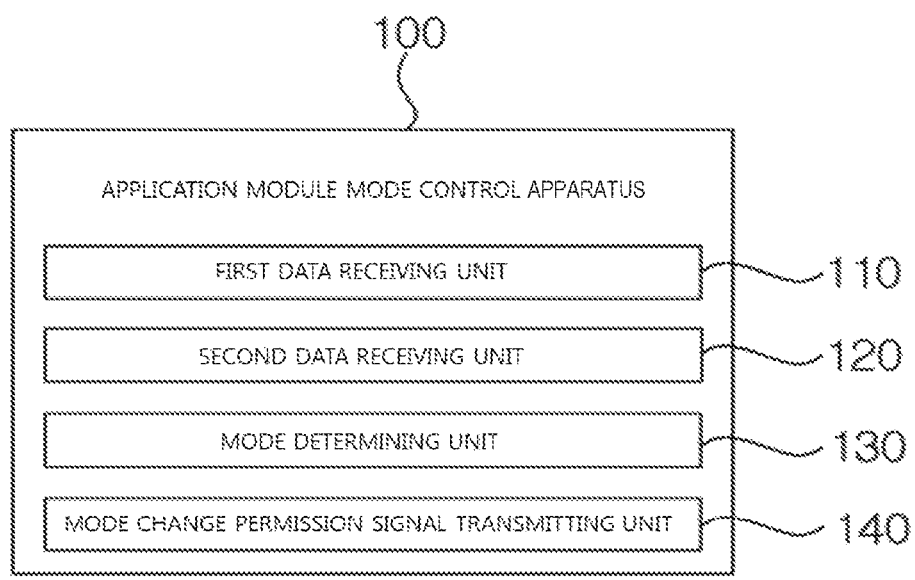
FIG. 5 is a block diagram illustrating a configuration of the application module mode control apparatus 100 according to the exemplary embodiment of the present invention.

Hereinafter, preferred embodiments will be presented in order to help understanding the present invention. However, the exemplary embodiments are just provided to easily understand the present invention and contents of the present invention are not limited to the exemplary embodiments.

FIG. 1 is a block diagram illustrating a configuration of an electric vehicle 1.

Referring to FIG. 1, in general, the electric vehicle may be configured to include a battery 2, a battery management system (BMS) 3, an electronic control unit (ECU) 4, an inverter 5, and a motor 6.

The battery 2 is an electric energy source that drives the electric vehicle 1 by providing drive force to the motor 6. The battery 2 may be charged or discharged by the inverter 5 depending on driving of the motor 6 or an internal combustion engine (not illustrated).

Herein, the type of battery 2 is not particularly limited and may be constituted by, for example, a lithium ion battery, a lithium polymer battery, a nickel cadmium battery, a nickel hydrogen battery, a nickel zinc batter, and the like.

Further, the battery 2 is formed by a pack in which a plurality of battery cells are connected in series or in parallel. In addition, one or more packs are provided to form the battery 2.

The BMS 3 estimates a state of the battery 2 and manages the battery 2 by using the estimated state information. For example, the BMS 3 estimates and manages the state information of the battery 2, which includes a state of charging (SOC), a state of health (SOH), a maximum input/output power permission amount, an output voltage, and the like of the battery 2. In addition, the BMS 3 controls the charging or discharging of the battery 2 by using the state information and furthermore, may estimate an exchange time of the battery 2.

The ECU 4 is an electronic control unit that controls a state of the electric vehicle 1. For example, the ECU 4 determines a torque degree based on information including an accelerator, a brake, a speed, and the like and controls an output of the motor 6 to be suitable for torque information.

Further, the ECU 4 transmits a control signal to the inverter 5 so as to charge or discharge the battery 2 based on the state information including the SOC, SOH, and the like of the battery 2 received by the BMS 3.

The inverter 5 allows the battery 2 to be charged or discharged based on the control signal of the ECU 4.

The motor 6 drives the electric vehicle 1 based on control information (for example, torque information) received from the ECU 4 by using electric energy of the battery 2.

Since the electric vehicle 1 is driven by using the electric energy of the battery 2, the battery 2 and the motor 6 may be connected through various circuits.

Meanwhile, one or more application modules connected with the BMS 3 for the battery 2 may be configured so as to change the respective modes and a mode change condition may vary for each project.

For example, Project A in which when a voltage measurement value measured through a specific application module is 5 V or higher, the mode is changed from B to C or Project B in which when the voltage measurement value is 6 V or higher, the mode is changed from B to C may correspond to the project.

That is, a separate mode change apparatus is required to change the modes of one or more application modules and when the mode change apparatus is positioned in each of the application modules or directly connected with one or more application modules, the specific application module may not be reused in the case where the mode condition of the project is to be changed.

Therefore, in the present invention, an application module mode control apparatus 100 capable of controlling the mode change of the respective application modules will be described through FIGS. 3 to 5 to be described below.

FIG. 2 is a diagram illustrating a mode change process of one or more application modules 40 on Project A in the related art. FIG. 3 is a diagram illustrating a mode change process of one or more application modules 40 on Project B in the related art.

Referring to FIGS. 2 and 3, the mode change of the application module 40 on Project A is directly performed in the application module 40.

Herein, one or more application modules 40 may mean modules that perform a function of the BMS 3 and include a measurement module, an estimation module, a diagnosis module, a calculation module, a communication module, a control module, a recording module, and the like.

In this case, in the case of Project A (a project in which the mode of the specific application module 40 is changed from B to C when the voltage measurement value measured by analog/digital converter (ADC) is 5 V or higher), since the mode condition (when the voltage measurement value is 5 V or higher) is defined in the application module 40, the corresponding application module 40 may not be reused as it is if the corresponding mode condition needs to be changed (for example, if Project A needs to be changed to Project B) and the mode of the corresponding application module 40 may not be changed from B to C unless the corresponding application module 40 substitutes for the application module 40 having a new mode condition.

Figure 6:
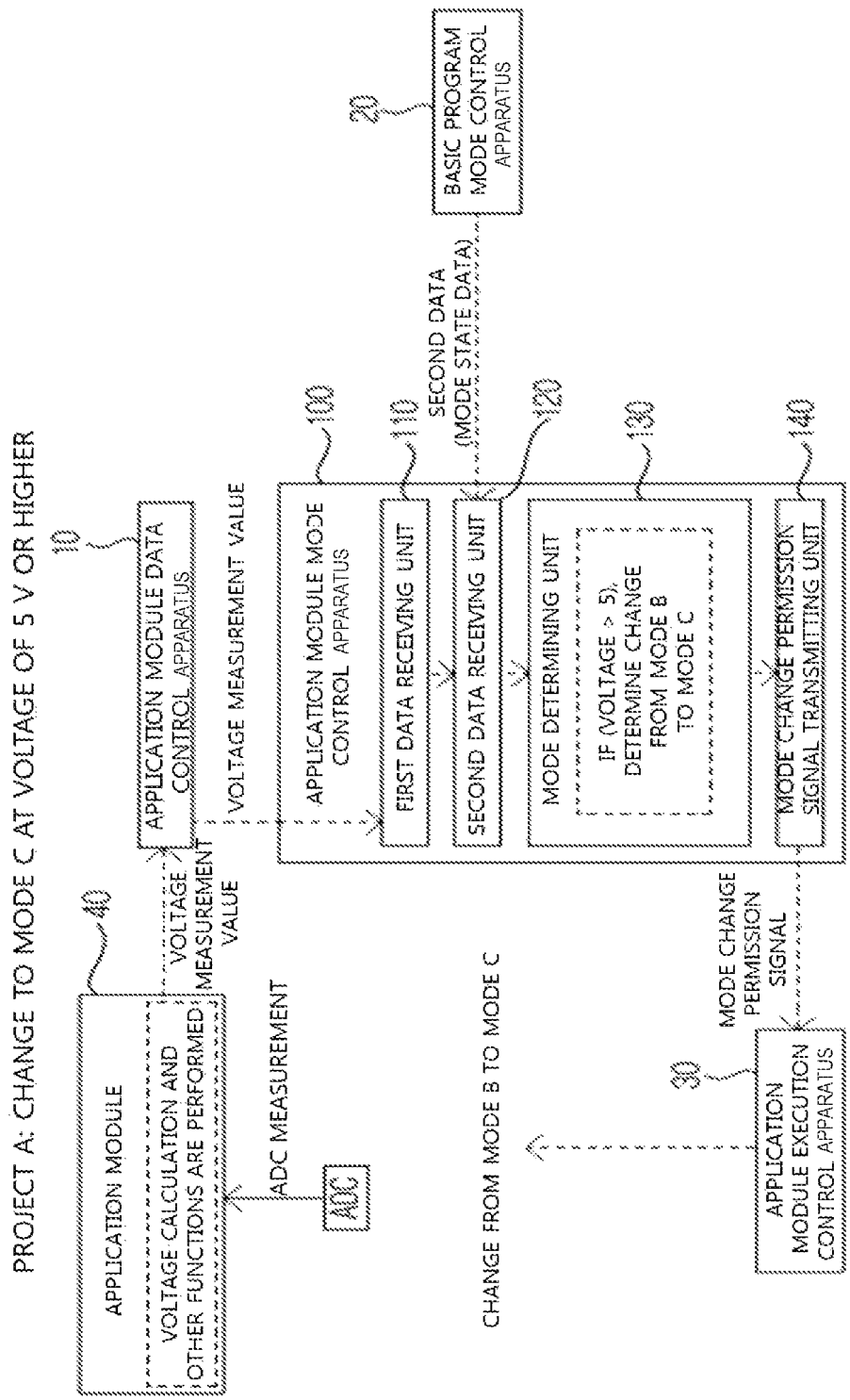
FIG. 6 is a diagram illustrating a mode change process of one or more application modules 40 through the application module mode control apparatus 100 on project A according to the exemplary embodiment of the present invention.
Figure 7:
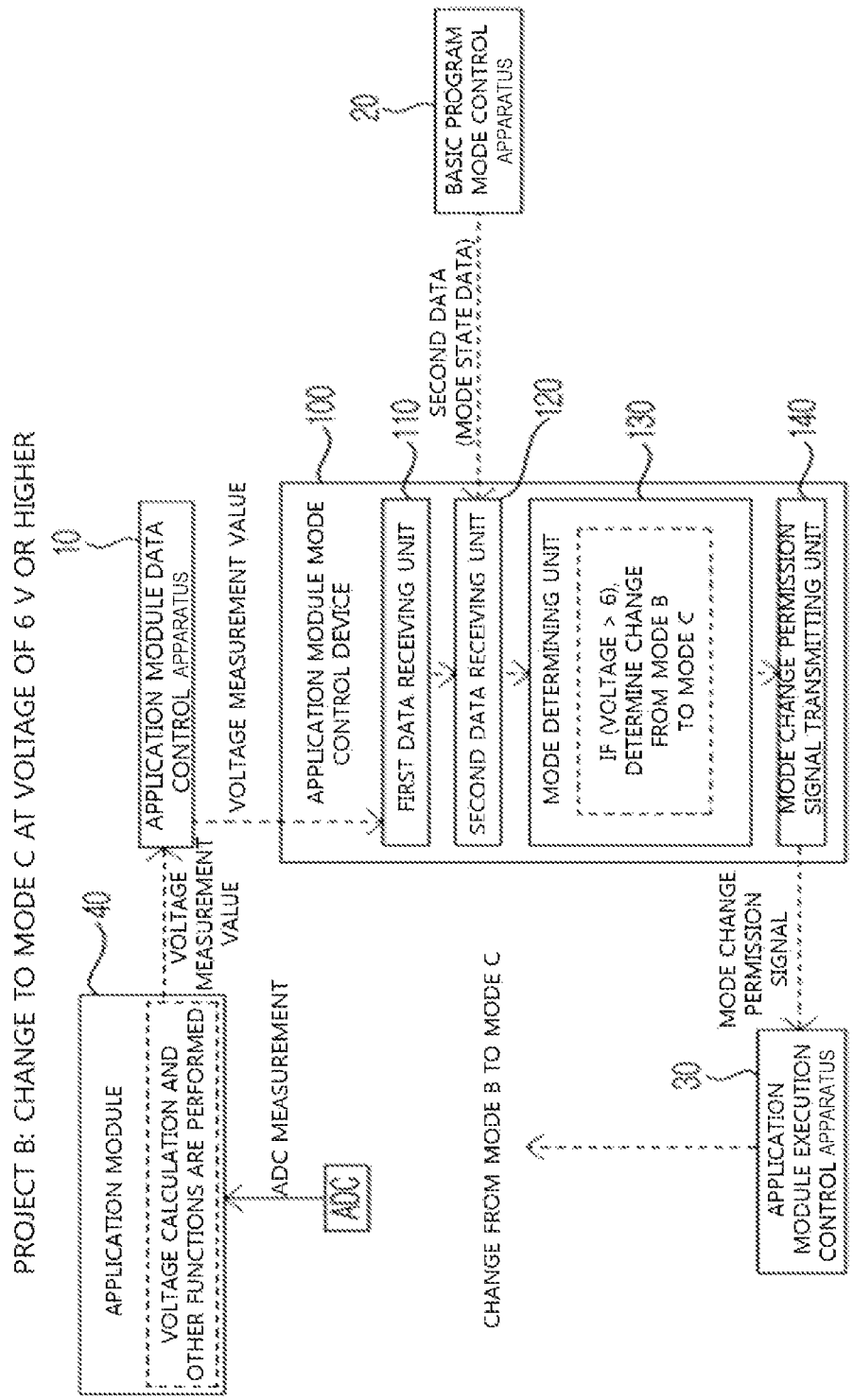
FIG. 7 is a diagram illustrating a mode change process of one or more application modules 40 through the application module mode control apparatus 100 on project B according to the exemplary embodiment of the present invention.

FIG. 4 is a diagram illustrating a connection state of an application module mode control apparatus 100 according to an exemplary embodiment of the present invention. FIG. 5 is a configuration diagram illustrating a configuration of an application module mode control apparatus 100 according to an exemplary embodiment of the present invention. FIG. 6 is a diagram illustrating a mode change process of one or more application modules 40 through the application module mode control apparatus 100 on project A according to the exemplary embodiment of the present invention. FIG. 7 is a diagram illustrating a mode change process of one or more application modules 40 through the application module mode control apparatus 100 on project B according to the exemplary embodiment of the present invention.

Referring to FIGS. 4 to 7, the application module mode control apparatus 100 includes a first data receiving unit 110, a second data receiving unit 120, a mode determining unit 130, and a mode change permission signal transmitting unit 140.

Referring to FIG. 5, first, the first data receiving unit 110 may serve to receive first data from an application module data control apparatus (data manager) 10.

Herein, the application module data control apparatus 10 may mean a device that relays sharing of data which needs to be shared among one or more application modules 40 that perform the functions of the BMS 3 in the middle to remove data dependency of one or more respective application modules and may include a data transceiving unit (not illustrated) transceiving one or more received data from one or more application modules, a data storing unit (not illustrated) storing one or more received data, and a data managing unit (not illustrated) selecting data required to execute the functions of one or more respective application modules among the stored data and transferring the selected data to the data transceiving unit so as to transmit the selected data to one or more application modules.

Further, herein, first data may mean all types of data which one or more application modules 40 store in the application module data control apparatus 10 and be recorded and stored in the application module data control apparatus 10 and further, if the first data receiving unit 110 reads and queries the first data, it is noted that the type of first data is not limited.

Meanwhile, the first data may include a voltage measurement value acquired by measuring a voltage value of a secondary battery and the voltage measurement value may be used in the mode condition in each project (Project A or B).

That is, the first data receiving unit 110 may serve to receive the voltage measurement values for one or more respective application modules from the application module data control apparatus 10.

Next, the second data receiving unit may serve to receive second data from a basic program mode control apparatus (BSW mode manager) 20.

Herein, the basic program mode control apparatus 20 may generally mean a device capable of changing a mode of an operating system (OS) for operating the BMS 3.

Further, the second data may mean data including mode state data of one or more respective application modules 40 transmitted from the basic program mode control apparatus 20.

For example, the second data may include mode state data (Mode A, Mode B, and the like) of a specific application module 40 and the mode state data may be used as a basis to determine a mode of the specific application module 40 by the mode determining unit 130 to be described below.

Next, the mode determining unit 130 may serve to determine the modes of one or more respective application modules based on the first and second data received through the first and second data receiving units.

In more detail, the mode determining unit 130 may perform mode condition determination of comparing the voltage measurement value received through the first data receiving unit 110 and a predetermined voltage value.

Herein, the mode condition determination may mean, for example, determining whether the received voltage measurement value is the predetermined voltage value (5 V) or higher.

Further, the mode determining unit 130 may serve to select mode state data corresponding to the comparison result value among the mode state data received through the second data receiving unit 120 and determine the mode of each application module based on the selected mode state data.

Herein, the mode state data corresponding to the comparison result value may mean, for example, mode state data in which the mode of the specific application module 40 corresponds to B when the received voltage measurement value is lower than 5 V and mode state data in which the mode of the specific application module 40 corresponds to C when the received voltage measurement value is equal to or higher than 5 V.

Further, in the mode determining unit 130, the mode determination of the application module 40 may vary according to the mode condition for each project (Project A or B).

Referring to Project A illustrated in FIG. 6, when the voltage measurement value which the first data receiving unit 110 receives from the application module data control apparatus 10 is equal to or higher than 5 V, the mode determining unit 130 determines that the mode of the corresponding application module 40 is changed from B to C.

On the contrary, referring to Project B illustrated in FIG. 7, when the voltage measurement value which the first data receiving unit 110 receives from the application module data control apparatus 10 is equal to or higher than 6 V, the mode determining unit 130 determines that the mode of the corresponding application module 40 is changed from B to C.

Last, the mode change permission signal transmitting unit 140 may serve to receive a mode change permission request from an application module execution control apparatus (activity manager) 30 and transmit a mode change permission signal (a signal for changing the modes of one or more respective application modules 40 to correspond to the mode determining unit 130) to the application module execution control apparatus 30.

Herein, the application module execution control apparatus 30 may mean a device that serves to remove dependency on a time among one or more application modules 40 that perform the functions of the BMS 3 and determine and call an execution time and an execution sequence of the functions included in the corresponding application module to allow the functions of the respective application modules 40 to be independently executed and called.

Meanwhile, the mode change permission signal may include both a permission signal for directly changing the modes of one or more application modules 40 and the mode state data (for example, Mode A, B, C, or D) of the application modules 40 to be changed.

Consequently, the application module execution control apparatus 30 that receives the mode change permission signal from the mode change permission signal transmitting unit 140 may arbitrarily change the modes of one or more application modules 40.

Next, an operation of the application module mode control apparatus 100 according to the present invention will be described in more detail.

Figure 8:
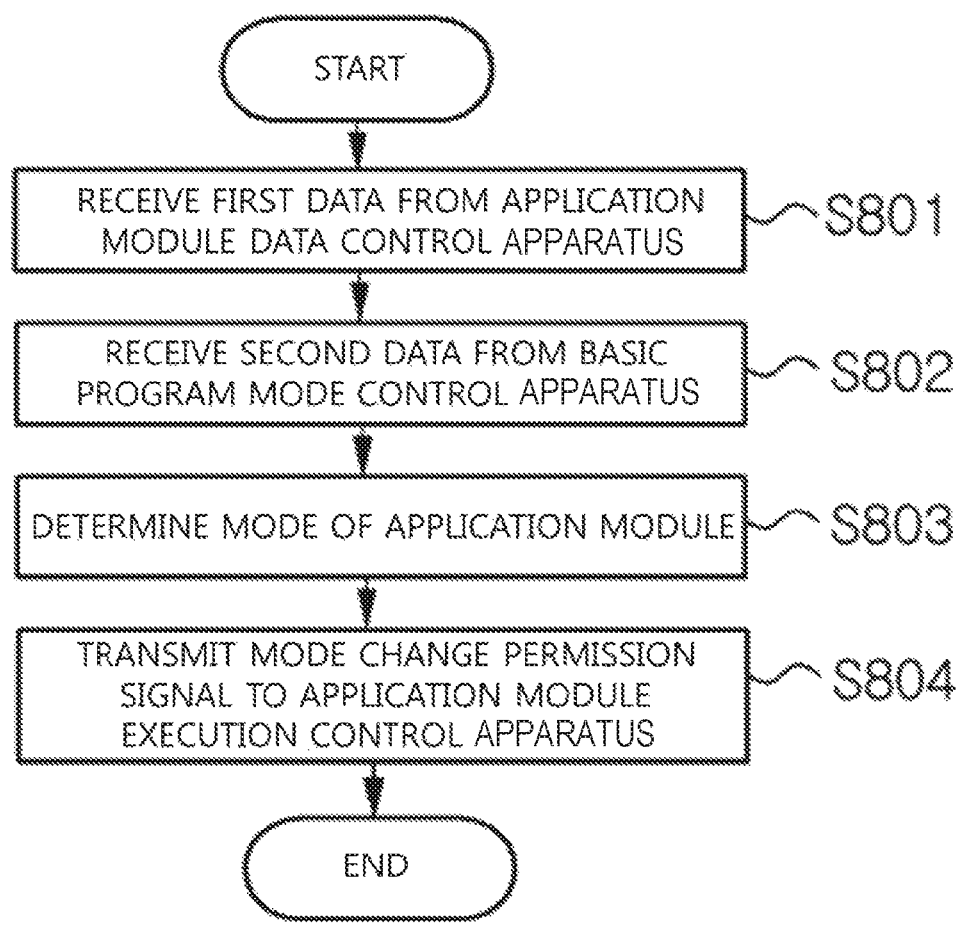
FIG. 8 is a flowchart illustrating an operating sequence of an application module mode control apparatus 100 according to an exemplary embodiment of the present invention.

FIG. 8 is a flowchart illustrating an operating sequence of an application module mode control apparatus 100 according to an exemplary embodiment of the present invention.

Referring to FIG. 8, first, the first data receiving unit 110 receives the first data from the application module data control apparatus 10 (S801). In this case, the first data may include voltage measurement values for one or more application modules 40

Next, the second data receiving unit 120 receives the second data from the basic program mode control apparatus (S802). In this case, the second data may include the mode state data (for example, Mode A, B, C, or D) for one or more application modules 40.

Next, the mode determining unit 130 determines the modes of one or more respective application modules 40 based on the first and second data (S803). In this case, in step S803, the voltage measurement value received by the first data receiving unit 110 is compared with the predetermined voltage value. In addition, the mode state data corresponding to the compared result value is selected among the mode state data received by the second data receiving unit 120.

Then, the mode change permission signal transmitting unit 140 receives the mode change permission request from the application module execution control apparatus 30 and transmits to the application module execution control apparatus 30 the mode change permission signal (the signal for changing the modes of one or more respective application modules 40 to correspond to the mode determined by the mode determining unit 130 (S804).

The present invention has been described in detail with reference to the preferred embodiments. However, it will be appreciated by those skilled in the art that various modifications and changes of the present invention can be made within the scope without departing from the spirit and the area which are defined in the appended claims and their equivalents.

The invention claimed is:

1. A battery management system (BMS) for controlling operation of a battery, configured to: receive voltage measurement values of the battery from an analog/digital converter via an application module data control device, wherein the application module data control device is configured to share data among a plurality of application modules and to relay the shared data,
   receive mode state data of first and second application modules of the plurality of application modules via the application module data control device,
   determine respective modes of the first and second application modules for charging or discharging the battery based on the voltage measurement values and the mode state data,
   compare one of the received voltage measurement values and a predetermined voltage value,
   select mode state data among the received mode state data for the first and second respective application modules corresponding to the compared result value of one of the received voltage measurement values and the predetermined voltage value,
   receive a mode change permission request from an application module execution control device, wherein the application module execution control device is configured to remove dependency among the plurality of application modules by determining and calling an execution time and an execution sequence of functions of the corresponding application module, transmit, to the application module execution control device, a mode change permission signal for changing the modes of the first and second respective application modules, and control the operation of the battery, including the charging or discharging of the battery, based on the changed modes of the first and second application modules, wherein the first and second application modules perform different functions of the BMS.

2. The battery management system of claim 1, wherein the voltage measurement values received from the analog/digital converter are for one or both of the first and second application modules.

3. A method for controlling operation of a battery via a battery management system (BMS), comprising:

receiving, voltage measurement values of the battery from an analog/digital converter via an application module data control device;

receiving, mode state data of first and second application modules connected to the battery management system from a basic program mode control device;

determining, respective modes of the first and second application modules for charging or discharging the battery based on the voltage measurement values and mode state data;

comparing, one of the received voltage measurement values and a predetermined voltage value, selecting, mode state data among the received mode state data for the first and second respective application modules corresponding to the compared result value of one of the received voltage measurement values and the predetermined voltage value, receiving, a mode change permission request from an application module execution control device, wherein the application module execution control device is configured to remove dependency among the plurality of application modules by determining and calling an execution time and an execution sequence of functions of the corresponding application module, transmitting, to the application module execution control device, a mode change permission signal for changing the modes of the first and second respective application modules; and controlling, the charging or discharging of the battery using the changed modes of the first and second application modules, wherein the charging and discharging of the battery is based on the voltage measurement values and mode state data of the respective module, wherein the first and second application modules perform different functions of the BMS.

4. The method of claim 3, wherein the voltage measurement values received from the analog/digital converter are for one or both of the first and second application modules.

5. The battery management system of claim 1, wherein the mode change permission request is submitted from the application module execution control device to change the mode when a voltage measurement value of the battery is 5V or higher.

6. The method of claim 3, wherein the mode change permission request is submitted from the application module execution control device to change the mode when a voltage measurement value of the battery is 5V or higher.

* * * * *